Oct. 14, 1924.　　　　　　　　　　　　　　　　1,511,714
G. W. BEADLE
MACHINE FOR MAKING TUBULAR ARTICLES
Filed Aug. 30, 1921　　　　8 Sheets-Sheet 2
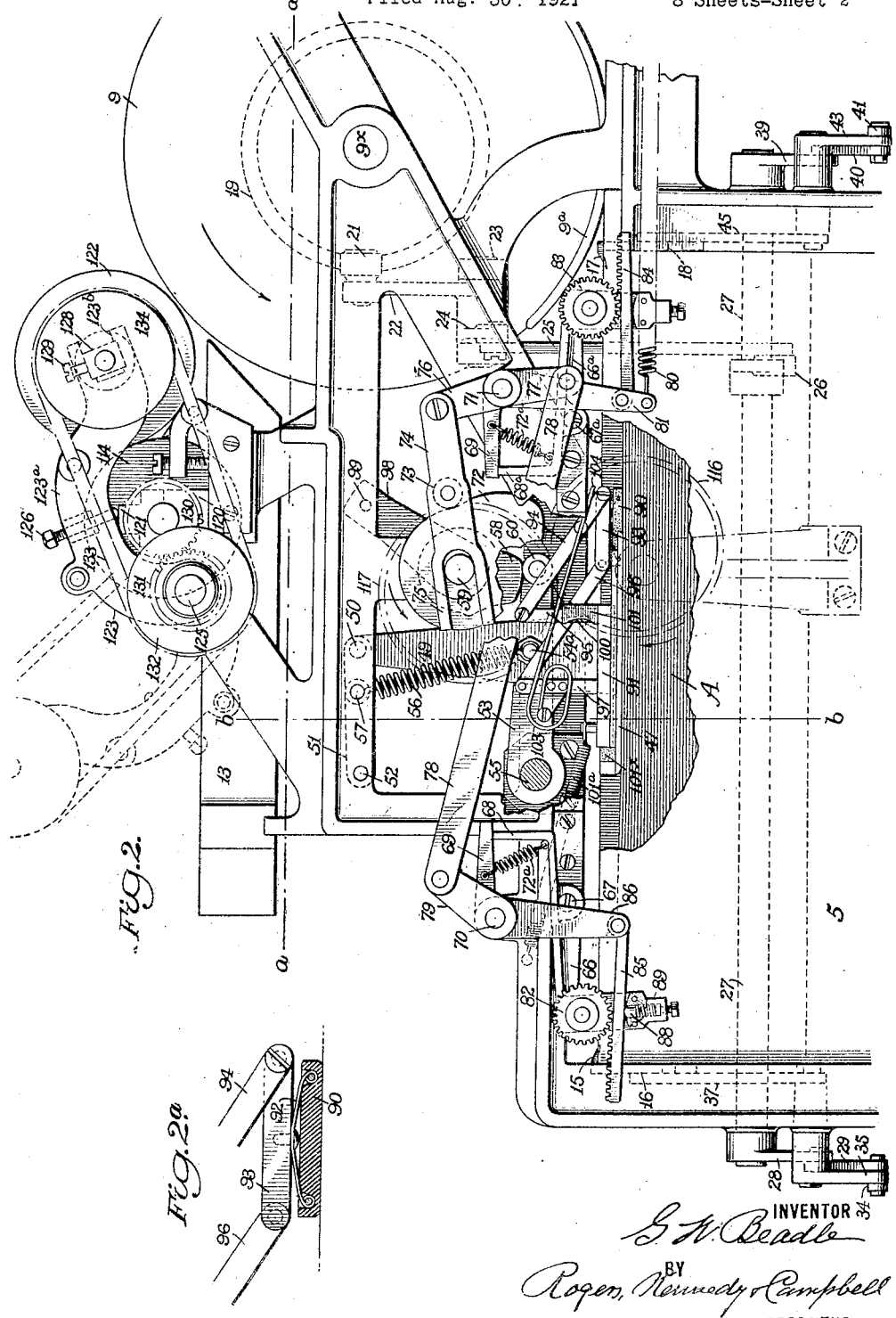
INVENTOR
G. W. Beadle
BY
Rogers, Kennedy & Campbell
ATTORNEYS

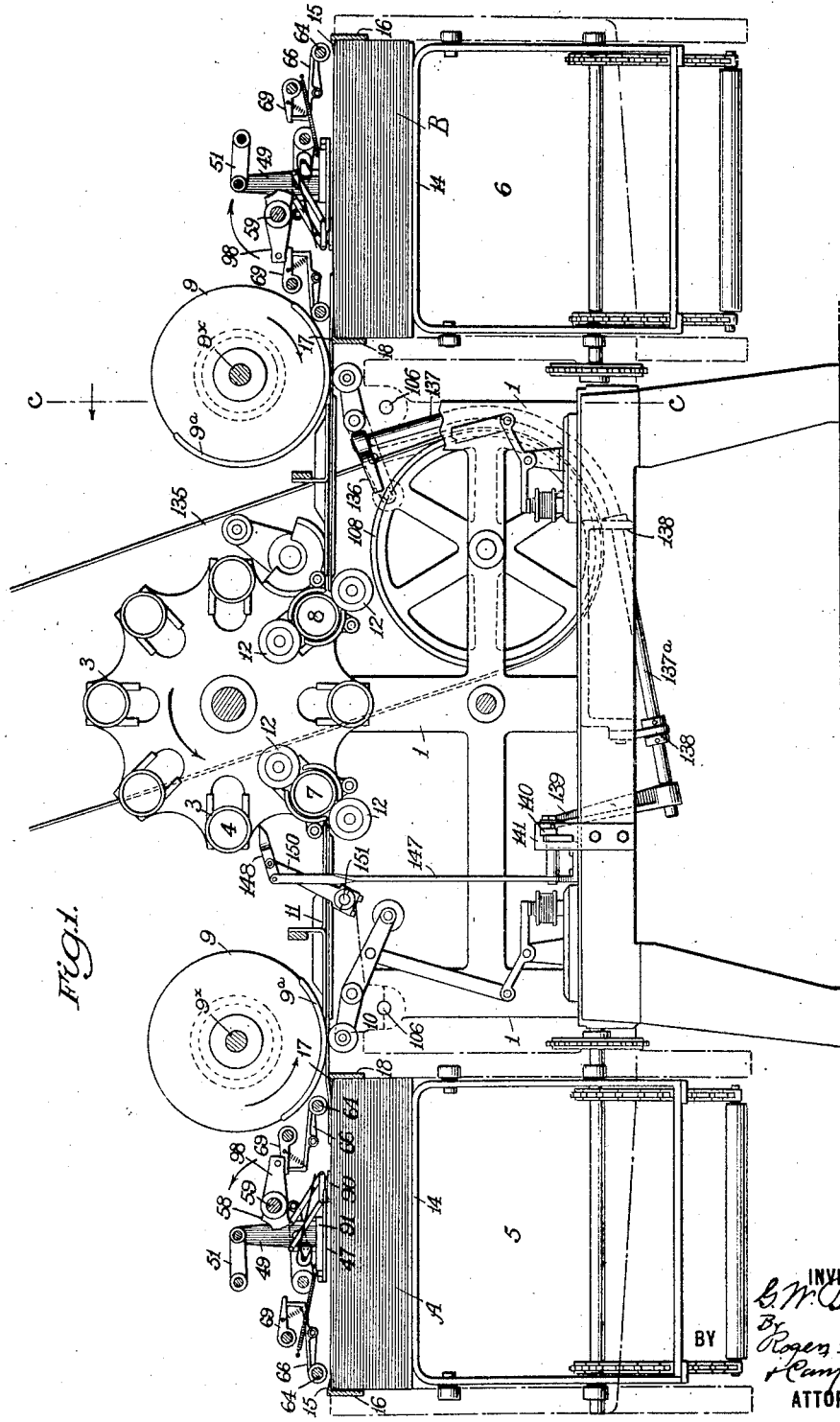

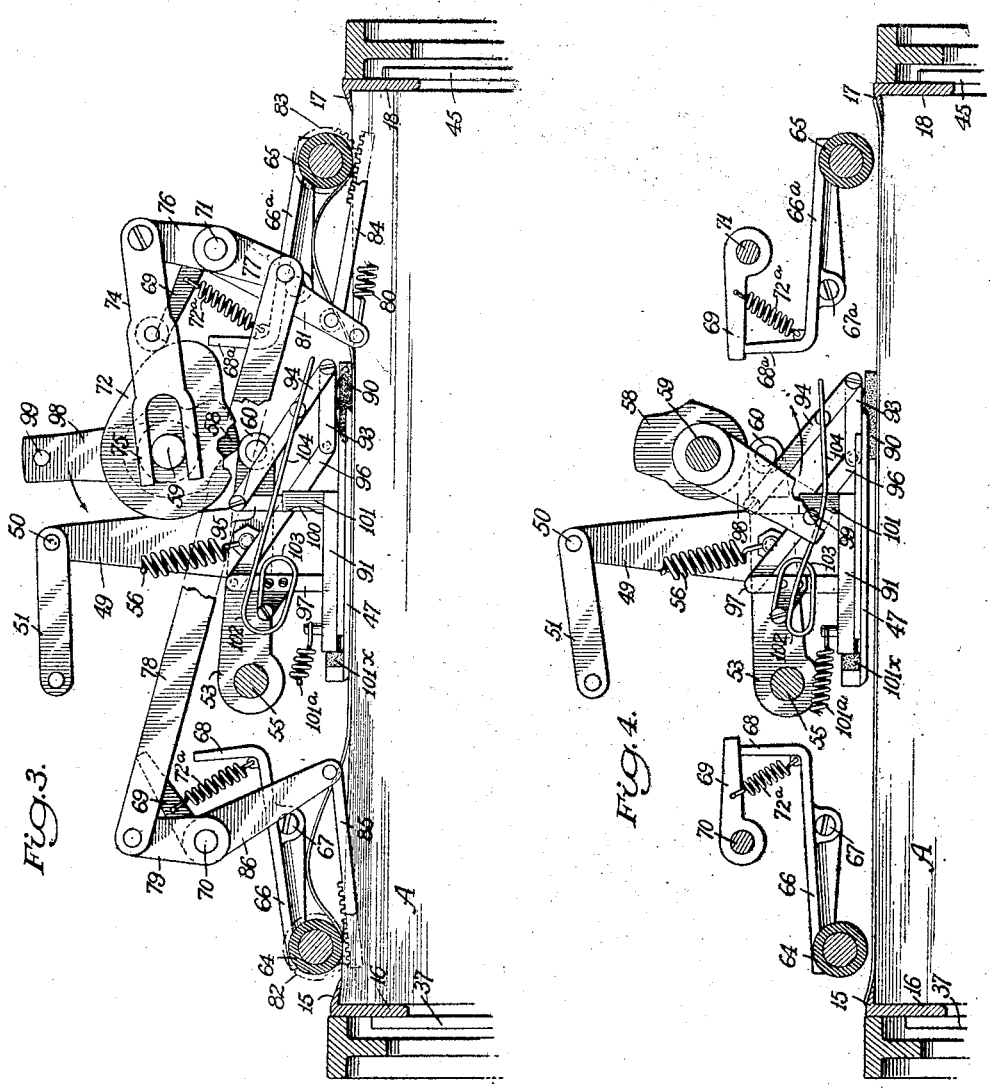

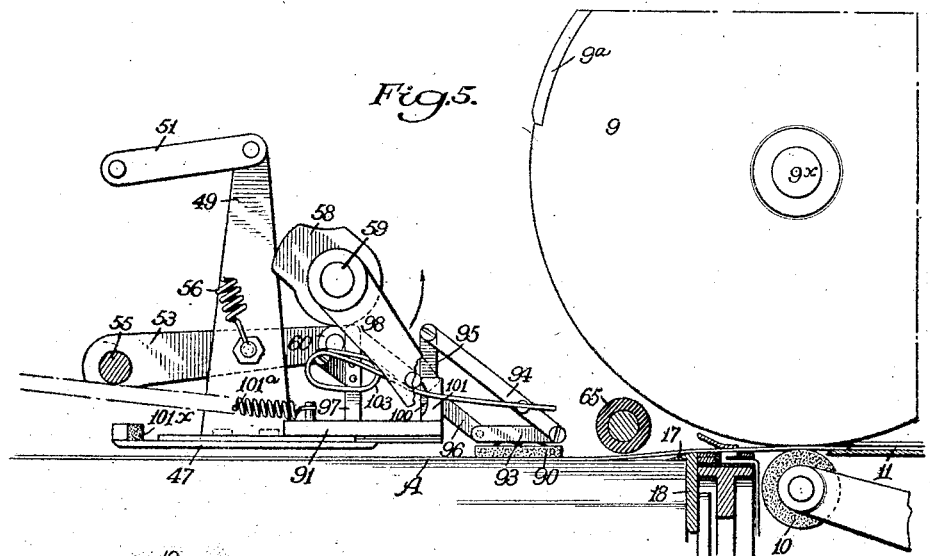
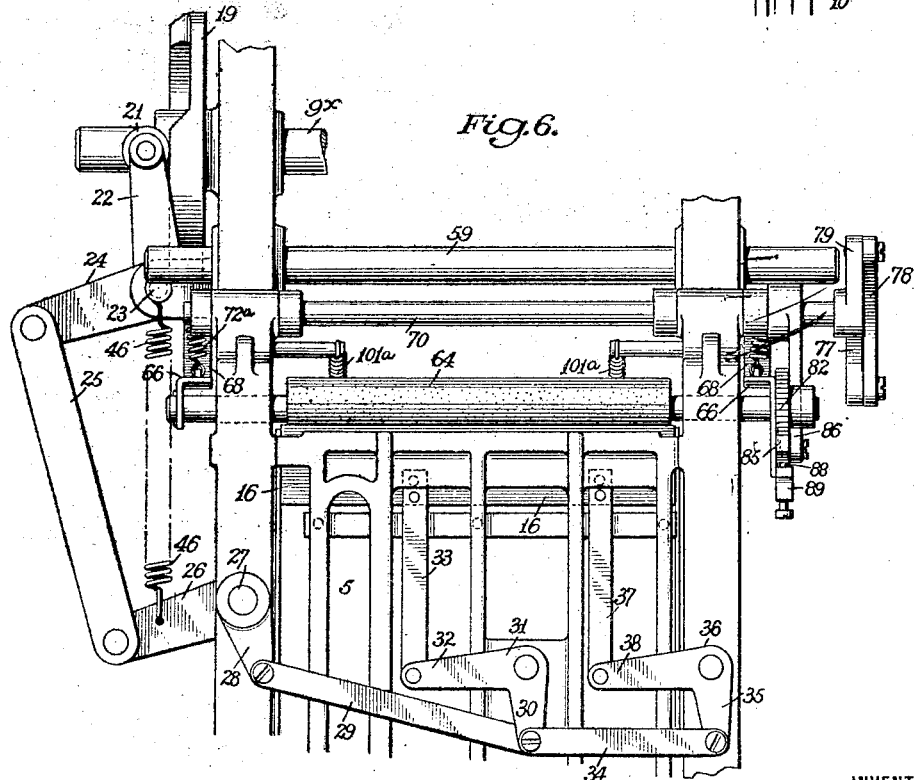

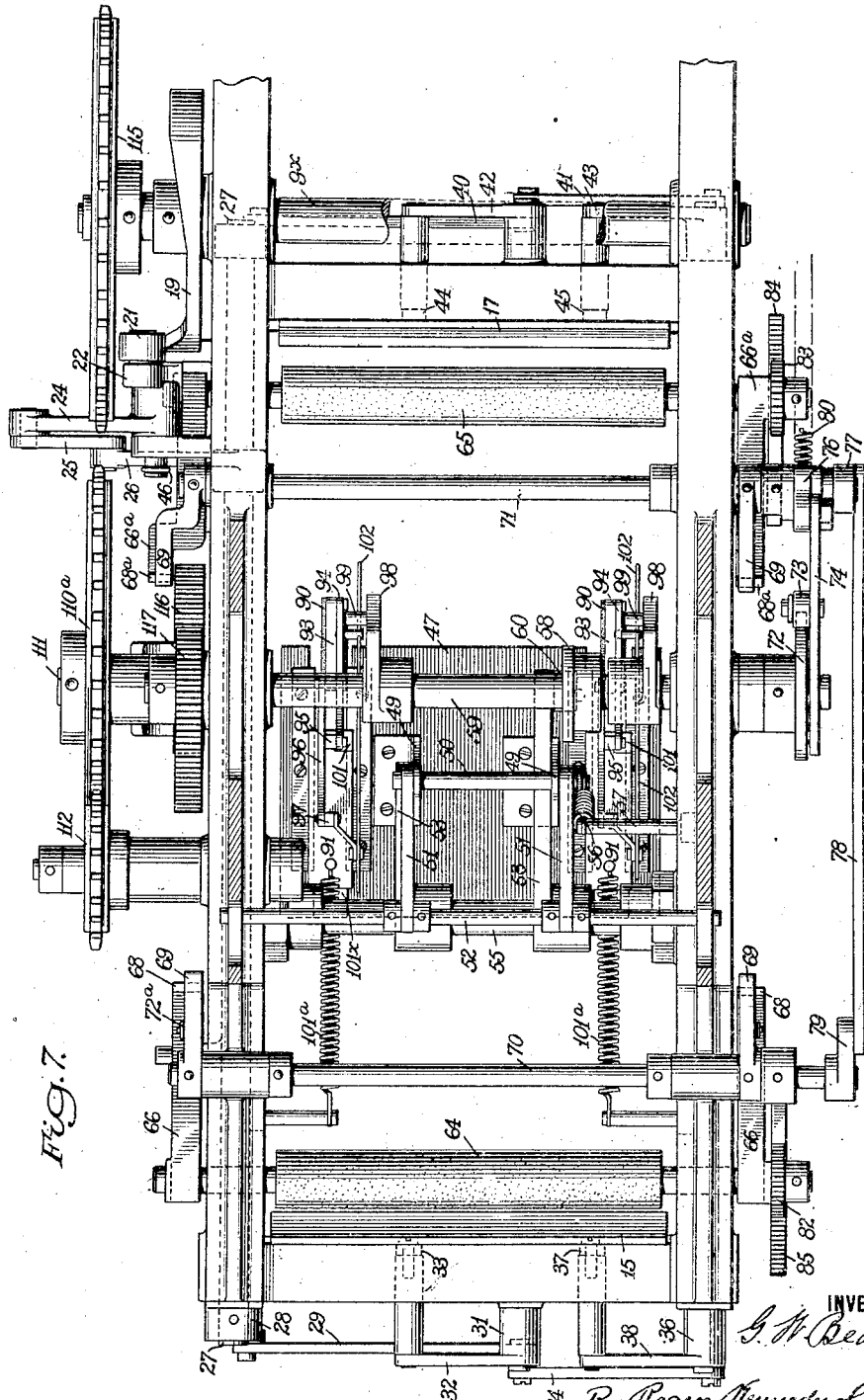

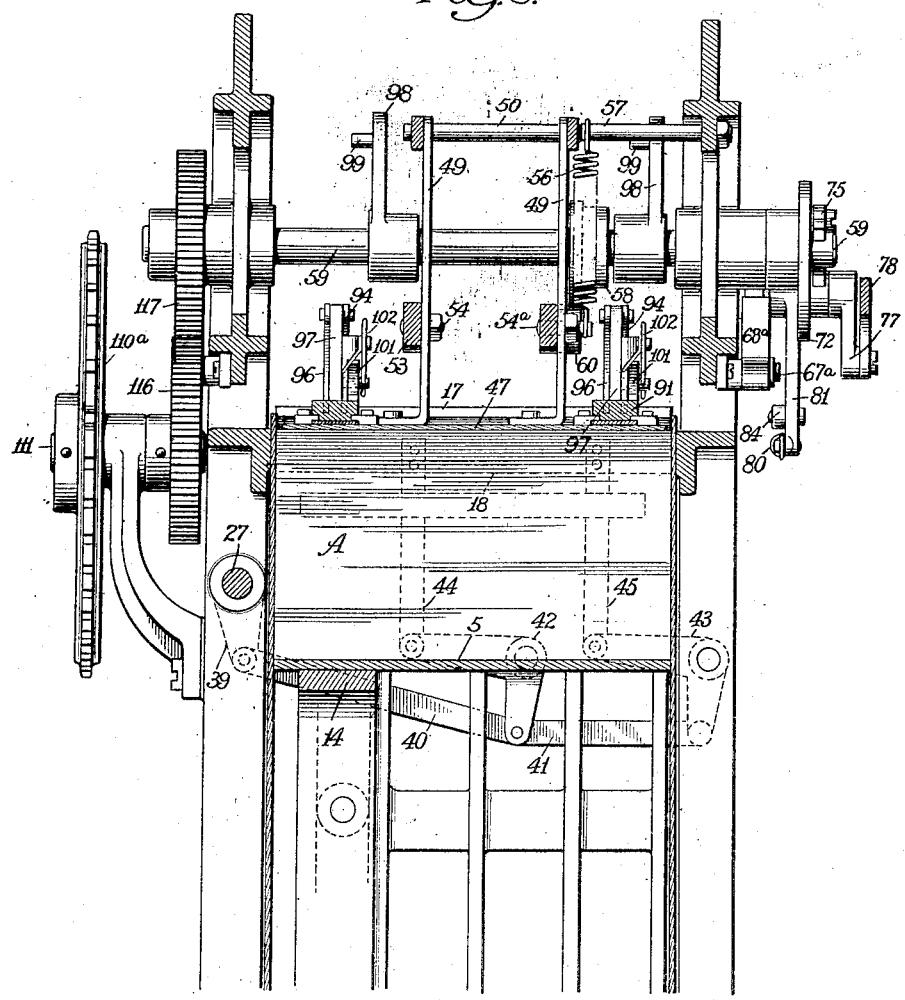

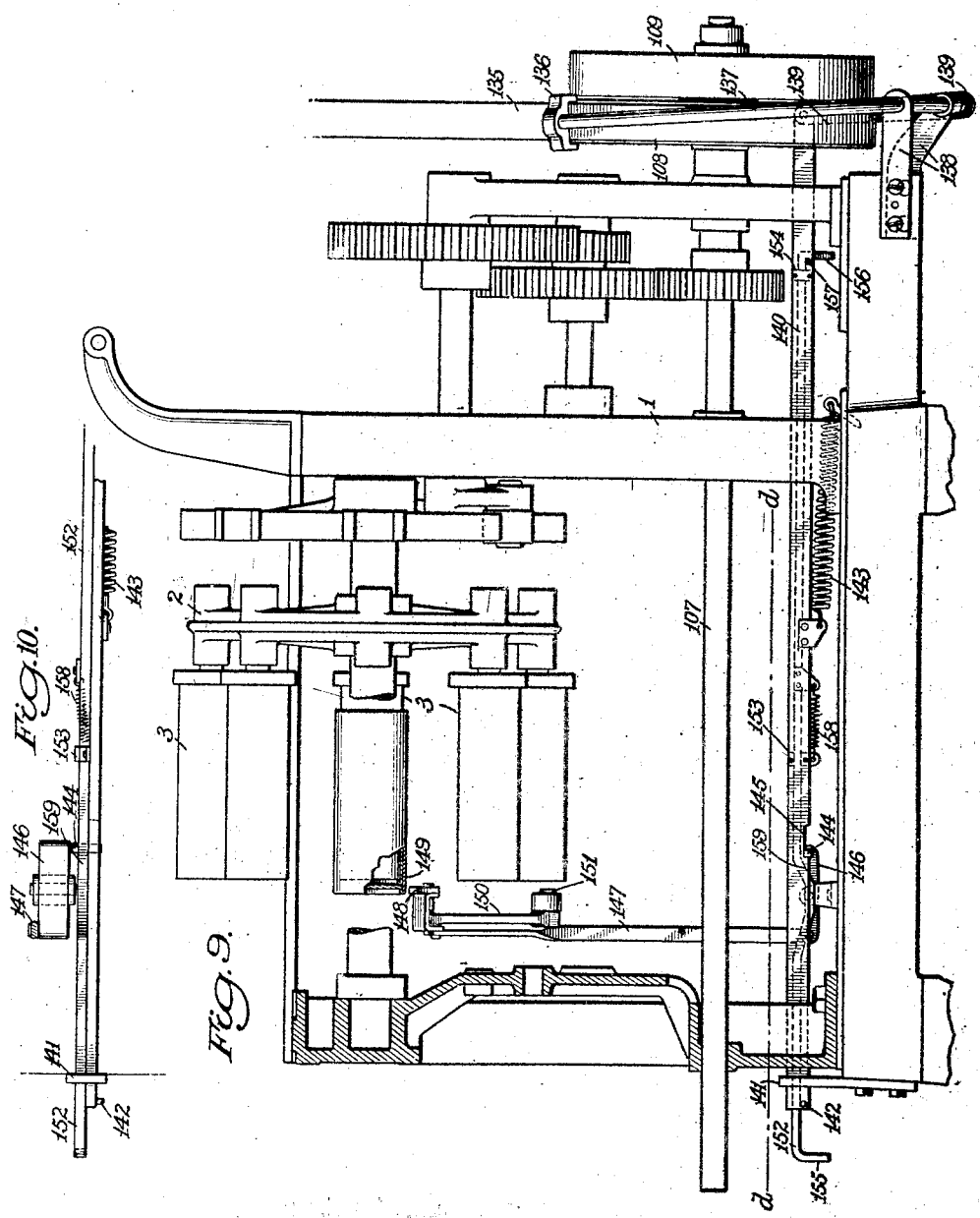

Oct. 14, 1924.

G. W. BEADLE 1,511,714

MACHINE FOR MAKING TUBULAR ARTICLES

Filed Aug. 30, 1921

INVENTOR
G. W. Beadle
BY
Rogers, Kennedy &
Campbell
ATTORNEYS

Patented Oct. 14, 1924.

1,511,714

UNITED STATES PATENT OFFICE.

GEORGE W. BEADLE, OF NEW YORK, N. Y., ASSIGNOR TO INTERNATIONAL PAPER COMPANY, A CORPORATION OF NEW YORK.

MACHINE FOR MAKING TUBULAR ARTICLES.

Application filed August 30, 1921. Serial No. 496,869.

*To all whom it may concern:*

Be it known that I, GEORGE W. BEADLE, a citizen of the United States, residing at New York, in the county of New York and State of New York, have invented certain new and useful Improvements in Machines for Making Tubular Articles, of which the following is a specification, reference being had therein to the accompanying drawing.

This invention relates to machines for making tubular articles, such as paper cartons or receptacles, and the invention consists of certain improvements more particularly concerned with the type of machine set forth in an application filed by me on the 5th day of May 1920, Serial No. 378,993. In the machine of said application a series of mandrels is mounted on a suitable carrier which is rotated step by step so that the individual mandrels will be presented in succession to blank extracting and feeding mechanisms, blank winding mechanisms, blank spinning mechanisms, bottom forming mechanisms, and an ejector mechanism for ejecting the finished carton from the mandrels, the said several mechanisms being formed and coordinated with each other in their operations to wind on each mandrel two blanks one upon the other, and seat a bottom within the first wound blank, and a second bottom against the first and within the second wound blank. In said machine the two blanks are extracted and fed to the mandrels respectively from two blank holders situated at opposite ends of the machine, and in their passage from the holders, the blanks are supplied with adhesive to cause the convolutions of the wound blanks to adhere to each other.

The present invention consists of certain improvements in the mechanism for extracting the blanks from the blank holders and advancing them to the mandrels, the said improvements having in view the separation of the top blank from the underlying blank with certainty and the advance of the separated blank and its presentation to the mandrel in an even and uniform manner and without danger of displacement or wrinkling.

The invention consists also of certain improvements in the mechanism for applying adhesive to the blanks, having in view mainly the adjustment of the transfer roll relative to the master roll and drum, and the capability of rendering the mechanism inactive at will.

The invention consists also of means for automatically arresting the operation of the machine in the event that the carton ejecting mechanism fails to eject the finished carton from the mandrel, the said means being adapted also for manual operation at both from the front and rear of the machine.

These several improvements will be fully described in the specification to follow, and the novel parts thereof will be set forth in the appended claims.

In the accompanying drawings:

Fig. 1 is a longitudinal sectional elevation of a machine of the general construction disclosed in my said application, with my improvements embodied therein, certain parts being omitted as unnecessary to an understanding of the invention.

Fig. 2 is a side elevation on an enlarged scale of one of the blank holders and the blank extracting and advancing mechanism and the associated adhesive applying mechanism, certain parts being broken away to expose other parts to view.

Fig. 2$^a$ is a sectional elevation of a detail of the blank extracting mechanism.

Fig. 3 is a side elevation partly in section, of the blank extracting mechanism with the parts thereof in the position they occupy in the first stage of the extracting operation.

Fig. 4 is a similar view showing the position of the parts in a further stage of the operation.

Fig. 5 is a similar view of the parts in the positions they occupy in the final stage of the operation.

Fig. 6 is an end elevation of the blank holder with certain parts broken away.

Fig. 7 is a horizontal sectional plan view on the line *a—a* of Fig. 2.

Fig. 8 is a vertical transverse sectional elevation on the line *b—b* of Fig. 2.

Fig. 9 is a transverse sectional elevation on the line c—c of Fig. 1 showing particularly the automatic mechanism for arresting the operation of the machine.

Fig. 10 is a horizontal sectional elevation on the line d—d of the preceding figure.

Figure 11:
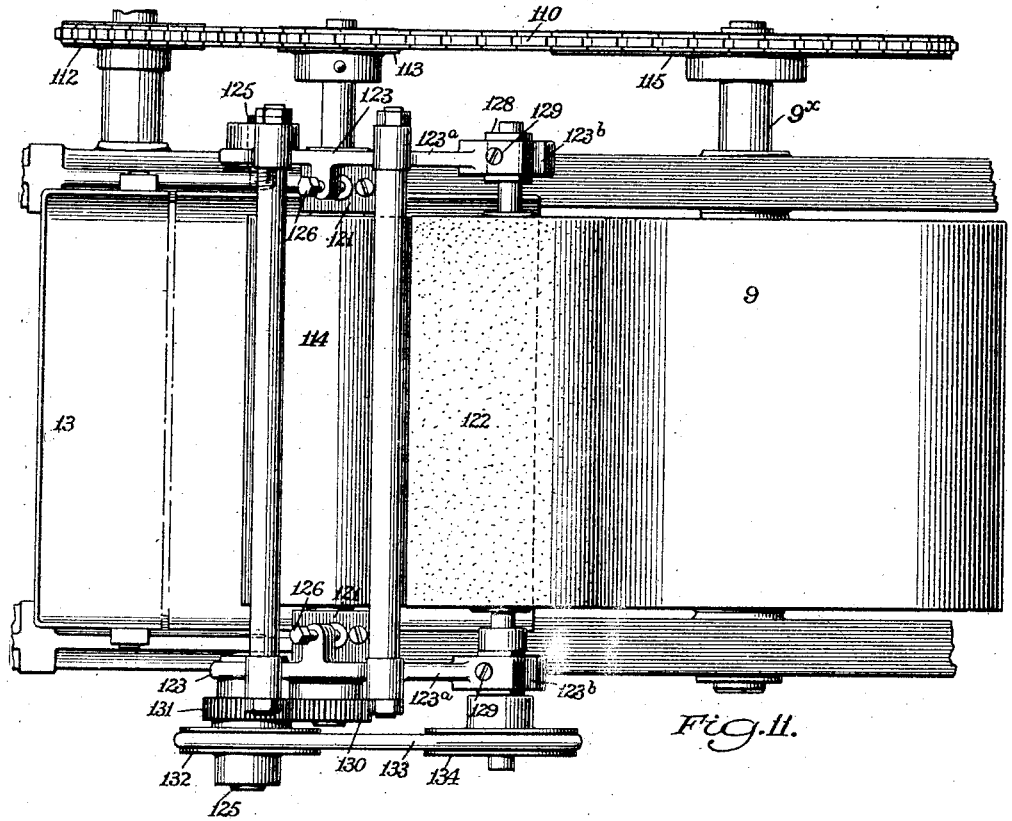

Fig. 11 is a top plan view of the adhesive applying mechanism.

Figure 12:
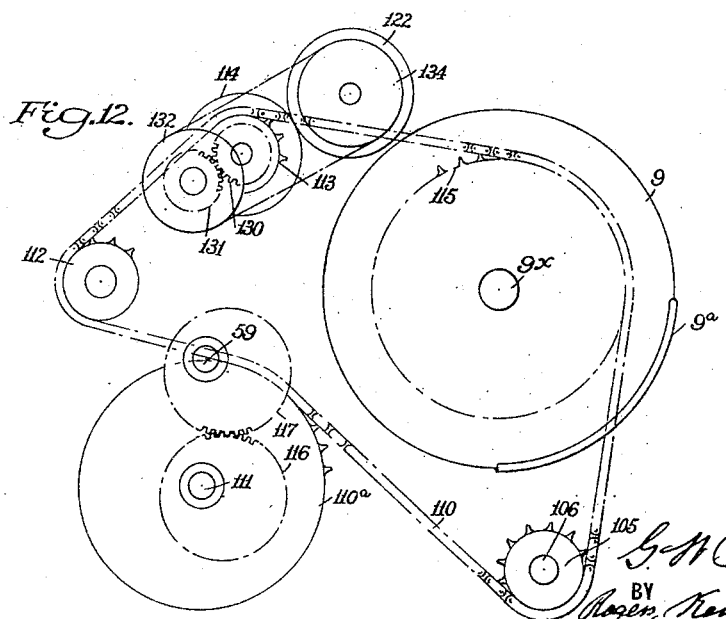

Fig. 12 is a diagram of the driving mechanism.

Referring to the drawings:

In the accompanying drawings I have shown my invention applied to a machine of the construction of that set forth in my said application above referred to, but it will be manifest that my improvements, more particularly the blank extracting mechanism, are not restricted in their use to this particular form of machine but are applicable to other machines in which individual sheets or blanks are handled and where it is necessary to extract the topmost blank successively from a pile of the same and present it to the action of mechanism to operate thereon.

Referring more particularly to Fig. 1 the framework 1 of the machine gives support to a rotatably mounted spider 2 carrying a number of mandrels 3 which project forwardly therefrom as best shown in Fig 9. There are eight of these mandrels, and the spider is moved in the direction of the arrow step by step, so that the mandrels will be presented successively to different stations to receive the two blanks and the latter subjected to different operations which go to make up the finished cartons which finally arrive at the ejecting station indicated at 4 where the finished cartons are successively ejected or stripped from the mandrels. The two blanks A and B of which the carton is made, are arranged in two piles respectively in blank holders 5 and 6 which are sustained by the frame of the machine at opposite ends thereof, so that a blank from each pile may be fed to and wound around each mandrel as the latter is by the movement of the spider presented first to station 7 to receive a blank A and then to station 8 to receive a blank B. In the feed of the blanks to the mandrels, the uppermost one of the pile is first separated or extracted from the top and then moved forwardly toward the center of the machine, and as it is thus advanced, its forward end is entered in the bight of a rotary feed drum 9 mounted on a shaft 9ˣ and a cooperating presser roll 10 by which the blank is fed forwardly through a guideway 11 and its forward end presented to the mandrel at station 7 or station 8 as the case may be. The blank at this point is acted on by opposing winding rolls 12, see Fig. 1, of which there are two pairs, one in position at station 7 and the other at station 8, and the action of the rolls is to wind the blank around the mandrel positioned between the rolls, the pair at station 7 winding the blank A on the naked mandrel, and the pair at station 8 winding the blank B on the previously wound blank A. The feed drums 9 are furnished each with a raised surface 9ᵃ to which an adhesive is applied from a suitable tank 13 (Fig. 2) as they are fed by the drum, whereby the convolutions of the blanks are cemented together and the second blank cemented to the first. The various details of the mechanisms above referred to are fully set forth in my application before mentiond, to which reference may be had for a more detailed description of said parts than is here given. In the foregoing description I have alluded to these mechanisms and their operations in general terms which is all that will be necessary for a full understanding of my present invention which will now be described.

Referring first to the mechanism for extracting the blanks from the pile, they are the same in every respect at both ends of the machine, respectively for the blanks A and B, and therefore a description of one, that operating on blanks A, will suffice.

The pile of blanks A in the holder 5 are acted on from beneath by a follower 14 urged upwardly with constant pressure so that the topmost blank will be pressed at its outer and inner ends beneath an outer horizontal blade 15 extending inwardly from a vertical plate 16 and an inner horizontal blade 17 projecting inwardly from a vertical plate 18, the said blades having their upper surfaces sloping downwardly and inwardly and the blades thus presenting knife edges for the purpose presently to be described. These blades constitute confining means for the ends of the top blank of the pile and they are raised in unison at the proper times to release the blank in order that the ends of the same may be withdrawn from beneath the blades in the extracting operation, and they are then lowered again to confine the next blank beneath. When the topmost blank is thus released its ends are withdrawn from beneath the raised blades by a blank flexing mechanism which flexes the blank at opposite sides of its middle portion where it is held down against the top of the pile by a blank holding device, and when the blades are lowered again, the blank flexing mechanism is operated to straighten out the ends of the blank which by said action are projected onto and up the sloping surfaces of the blades. The holding device then releases the blank and the latter is acted on by a blank advancing mechanism which pushes the blank forwardly over the top of the holder and advances it to the action of the feeding drum.

The raising and lowering movements of the blades may be effected by any suitable means, but in the present instance the mechanism shown more particularly in Figs. 2, 5, 6, 7 and 8 is employed. Here it will be seen that a face cam 19 is mounted on the horizontal transverse rotary shaft 9× before alluded to near the end of the shaft, which cam engages a roller 21 carried by the vertical arm 22 of a bell crank lever pivoted to stud 23 in the frame. To the other arm 24 of this lever is pivoted the upper end of a link 25 which in turn is pivoted at its lower end to the end of an arm 26 fixed to a shaft 27 extending longitudinally at the rear side of the blank holder. At its outer end, and outside of the blank holder, the shaft 27 has fixed to it a crank arm 28 to the end of which is pivoted one end of a link 29 the other end of which is pivoted to the vertical arm 30 of an elbow lever 31 pivoted to the frame of the blank holder. The horizontal arm 32 of said elbow lever has pivoted to it the lower end of a vertical rod 33 whose upper end is fixed to the vertical plate 16 of the blank confining blade 15. A horizontal link 34 is pivoted at one end to the vertical arm of said elbow lever and at its opposite end to the vertical arm 35 of a second elbow lever 36 pivoted to the frame of the blank holder alongside the other elbow lever, and a vertical rod 37 is pivoted at its lower end to the horizontal arm 38 and is fixed at its upper end to said plate 16. The vertical plate 18 of the other blank confining blade 19 at the inner end of the blank holder is connected in a similar manner to the longitudinal shaft 27 through the medium of a crank arm 39, Fig. 8, links 40 and 41, elbow levers 42 and 43 and rods 44 and 45 pivoted to said elbow levers and fixed to the plate 18. The roller 21 is held engaged with the cam 19 by means of a pull spring 46 (see Fig. 6) having its lower end connected with arm 26 and its upper end connected with the pivot stud 23 before alluded to, and the form and relation of the parts are such that when the rise of the cam is in engagement with the roller 21, the two blades will be in lowered position confining the ends of the topmost blank, and the blades will be raised to release the blank when the drop of the cam engages the roller, the raising action being effected by the spring 46 in its pull on the arm 26 and by the connections therefrom to the two blades. By this mechanism the two blades are raised in unison and lowered in unison periodically in proper coordination with the action of the blank flexing mechanism and the blank holding device and the blank advancing mechanism which parts will now be described.

The blank holding device consists in the present instance of a horizontal plate 47 best shown in Figs. 7 and 8, which is sustained over the middle portion of the pile of blanks so that it may be lowered and raised to respectively hold the top blank at its center and release the same. This plate is fixed to the lower ends of two standards or brackets 49 spaced some distance apart from each other laterally and connected together at their upper ends by a horizontal cross bar 50 pivotally connected to the standards. Upper parallel links 51 are pivoted on the ends of the cross bar and extend longitudinally therefrom and have their outer ends pivoted on a horizontal transverse cross bar 52 sustained by the frame of the blank holder parallel with the cross bar 50; and lower horizontal parallel arms 53 are pivoted to the standards on axes 54 and 54ª, and extend longitudinally therefrom parallel with the links 51 and below the same and are pivoted at their outer ends to the frame on an axis 55. The axes 54 and 54ª are in vertical alignment with the points of pivotal connection of the standards 49 with the cross bar 50, and the axis 55 is in vertical alignment with the points of pivotal connection of the links 51 with the cross bar 52. As a result of this arrangement of the parts, the two pairs of links 51 and 53 pivoted as described, constitute a parallel movement for the holding plate, which maintains the plate in a horizontal position parallel with the surface of the pile of blanks, as the plate moves up and down. A pull spring 56 has its lower end connected with the axis 54ª and has its upper end connected with a pin 57 projecting inwardly from the frame of the blank holder and it acts on the plate with a lifting force tending to raise it from the top blank of the pile. The plate is lowered to engage the blank and press down thereon by any suitable means, in the present instance by means of an edge cam 58 (see Figs. 2 and 8) which is mounted on a transverse rotary shaft 59 journalled in bearings on the sides of the blank holder. The edge cam engages a roller 60 mounted on an extension 61 of one of the arms 53. When the rise of the cam engages the roller, the holding plate will be lowered against the pull of the spring and will press down on the blank, and when the drop of the cam engages the roller, the spring will pull up on the plate and raise the same from the blank and release it, these movements taking place periodically in proper coordination with the action of the other parts of the blank extracting mechanism.

In the operation of the parts so far described, the holding plate normally is in lowered position pressing upon the middle portion of the pile and holding the topmost blank down at this point, and while in this position, the confining blades are raised to release the top blank at its ends, and while the blades are in raised position and the plate still holding the blank, the blank flexing mechanism comes into action and flexes or buckles the blank at the opposite sides of the holding plate so as to withdraw the ends of the blank from beneath the raised blades. This flexing mechanism will now be described.

In its preferred form the flexing mechanism comprises two rubber faced or roughened rollers 64 and 65 which extend transto the arms 68 and 68ª and the rocking fingers 69 the said springs coming into action when the fingers 69 are raised to disengage the arms as shown in Fig. 3, and then acting to rock the levers 66 and 66ª downwardly at their outer ends and cause the rolls to engage the blank with yielding spring pressure. The springs thus constitute means for lowering the swinging roll of wheel 83 are engaged by a rack bar 84, and the teeth of wheel 82 are engaged by a rack bar 85, so that when the two rack bars are drawn inwardly endwise towards each other the two wheels, and consequently the rolls thereon, will be positively rotated towards each other as described and will thereby pull the ends of the blank inwardly from beneath the blades and flex the same as shown in Fig. 3. When the rack bars are moved in the opposite direction, the rolls will be reversed in their rotation and will straighten out the flexed blank to the position of Fig. 4. Rack bar 84 is pivoted at its inner end to the arm 81 before alluded to and rack bar 85 is pivoted at its inner end to a similar arm 86 fixed to and extending downwardly from rock shaft 70. The result being that when the two shafts are rocked in a direction to lower the rolls as above described, the lowering action will be followed by the inward movement of the rack bars and the withdrawal of the ends of the blanks from beneath the blades, and when the shafts are rocked in the opposite direction, due to the contour of the operating cam and the relation of fingers 69 to arms 68 and 68$^a$, the rack bars will be moved endwise outwardly and will rotate the rolls in a direction to straighten out the flexed blank, this action taking place before the fingers engage the arms to raise the rollers. The rack bars are maintained in engagement with the ratchet wheels by means of vertical plungers 88 mounted in frames 89 sustained by the axles of the rolls and depending therefrom at the sides of the rack bars, as shown in Fig. 2, the said plungers being spring pressed upwardly against the under sides of the bars and thus acting to hold the teeth of the bars in yielding engagement with the teeth of the wheels, while permitting the bars to slide along on the plungers as the former are moved endwise.

The effect of the operation of the mechanism so far described is to separate the top blank from the pile and to place it in the position shown in Fig. 4 where it rests upon the top of the pile with its ends overlying and resting loosely on the confining blades 15 and 17 which are holding down the next blank beneath, the separated blank being now ready to be advanced to the feeding action of the feeding drum 9 and cooperating presser roll 10 before alluded to. The advance of the blank from this position is effected by means of the advancing mechanism before alluded to which in the present instance comprises a pair of pushing members or pads 90—90 spaced apart from each other laterally so as to engage with the blank at points distant from each other. These pads are formed of some yielding material which will take a grip on the blank, such for instance as soft rubber and they are connected respectively with supports or slides 91—91 mounted to slide back and forth longitudinally in guideways in the holding plate 47, which slides are acted on by operating mechanism presently to be described, and at the proper intervals are slid forwardly in the guides so as to engage the pads with the blank and advance the same. As shown more particularly in Fig. 2$^a$ each pad has embedded in its upper side a spring yoke 92 which is riveted or otherwise fastened to the under side of a block 93 at its center. An inclined link 94 is pivoted at its lower end to the forward end of the block and at its upper end it is pivoted to the upper end of a post 95 rising from the forward end of the slide 91; and a second link 96, extending parallel to link 94, is pivoted at its lower end to the rear end of the block and is pivoted at its upper end to the upper end of the post 97 rising from the slide some distance from the other post and parallel therewith, the said links and their pivotal connections with the parts as described constituting a parallel movement for the pad and connecting the same flexibly with the slide; whereby the under face of the pad will be maintained in a horizontal position and will contact flatly and throughout its area with the upper face of the blank. The two links 94 and 96 are inclined downwardly and forwardly in the direction of the advance of the blank, and with the pad engaged with the blank, the movement of the upper pivotal ends of the links in a horizontal line as the slide advances will cause the lower ends of the links to exert a downward pressure on the pad and thereby cause the latter to firmly grip the blank.

The two slides 91 are moved forwardly in their guides at the proper time to effect the advance of the blank, by means of two actuating members in the form of arms 98—98 fixed to the shaft 59 and provided respectively with laterally extending pins 99—99 in such position that as the arms are revolved by the rotation of the shaft, the pins will engage the inwardly curved edges 100—100 of upstanding lugs or abutments 101—101 fixed to the respective slides. The form, construction and relation of these parts is such in respect to the length of the blank and to the location of the bight of the drum 9 and presser roller 10, that the pins will not disengage the curved surfaces of the lugs until after the forward end of the blank has been entered in the bight of the drum and roller and is grasped thereby for its forward feed. After the disengagement of the pins from the lugs, the slides are returned to their former positions by means of two pull springs 101$^a$—101$^a$ attached at one end to the slides and at their opposite ends to the frame of the blank holder, buffer blocks 101ˣ—101ˣ being seated between the ends of the slides and guides to cushion the shock of the return movement.

The two pads are acted on by means of torsion springs 102—102 respectively, which springs are formed at one end with coils 103—103 fixed to the posts 97 whence the springs extend longitudinally in the form of horizontal spring arms 104—104 which are fixed respectively to the inclined links 94. These spring arms extend in the path of movement of the pins 99 on the revolving arms 98, and as a result of this arrangement when the arms swing down to engage the lugs on the slides, the pins will engage and deflect the spring arms downwardly and will force the pads down on the blank with spring pressure while being advanced by the advancing movement of the slides.

The three cams 19, 58 and 72 and the revolving arms 98 above described for operating respectively the confining blades, holding plate, flexing mechanism, and advancing mechanism, are so coordinated in their actions that the following sequence of movements are carried out in one cycle of operation of the blank extracting mechanism. Assuming that the confining blades are in lowered position confining the ends of the blank and that the holding plate is also in lowered position pressing upon and holding the blank down at its middle portion, and the flexing rolls raised, the first action in the cycle of operation is the elevation of the confining blades to release the blank, which is effected by the cam 19 and the connections therefrom to the blades. Next the flexing rolls are lowered into contact with the blank and are then rotated inwardly at their lower sides to flex or buckle the blank and thereby withdraw its ends from beneath the raised blades, which latter next descend and confine the ends of the next blank beneath as shown in Fig. 3. These operations of the rolls are effected by the cam 72 which in its continued rotation reverses the rotation of the rolls and straightens out the blank so that its ends will rest upon the upper sides of the blades; and following this reverse rotation of the rolls, the rolls are elevated out of contact with the blank as shown in Fig. 4. All this time the holding plate is in lowered position holding the blank at its middle. Next the holding plate is raised out of engagement with the blank by the action of spring 67, so that the blank is now wholly released and ready to be advanced. The revolving arms 98 now come into action, the pins thereon first engaging and deflecting the spring arms 104 downwardly, and then engaging the lugs 101 on the slides and moving the same endwise in their guides and pushing the pads forward and advancing the blank, the forward end of the blank in the advancing movement entering the bight of feeding drum 9 and presser roller 10 by which the blank is fed forward to be wound on the mandrel at station 7. On the completion of the advance of the slides by the pins 99, the latter disengage the lugs and the slides are returned to their former position against the buffer blocks by springs 101ᵃ, and as the outer end of the blank in the feeding action passes the inner end of the holding plate, the latter is lowered into engagement with the next blank by the action of cam 58. This completes the cycle of operation, and the parts are now ready for a repetition of the described operations on the next blank.

The various parts hereinbefore described may receive their motion and be driven from any suitable source of power to cause them to function in the manner set forth, but when employed in connection with a machine of the type of my application above referred to, they are driven from a sprocket wheel 105, see Figs. 1 and 12, on a transverse shaft 106 which shaft receives its motion as shown in my said application, from a drive shaft 107 on which is mounted a fast drive pulley 108 and a loose pulley 109, see Fig. 9. A sprocket chain 110 passes around the wheel 105 and over a sprocket wheel 110ᵃ on a transverse stub shaft 111, then over an idler sprocket 112, a sprocket wheel 113 on a roll 114 which dips into the adhesive containing tank 13 of the adhesive applying mechanism before referred to, and finally over a sprocket wheel 115 on the shaft 9ˣ carrying the feeding drum 9 before alluded to. The shaft 111 carries a pinion 116 mounted eccentrically thereon, which pinion meshes with a pinion 117 mounted eccentrically on the shaft 59 carrying the cams 58 and 72 and the revolving arms 98 so that these various parts are driven from the driving sprocket 105 through the medium of the sprocket chain 110.

The purpose of the eccentric mounting of pinions 116 and 117 is to cause the movements of the parts of the extracting mechanism to be accelerated at the moment that the revolving arms 98 come into action on the slides 91 in order that the advance of the blanks will be rapidly effected. To effect this action, the pinions are so relatively mounted on their respective shafts that the longer radius of the driving pinion 116 will be opposed to the shorter radius of the driven piston 117 when the revolving arms engage and advance the slides.

Referring now to Figs. 2 and 11 which illustrate the improved features of the adhesive applying mechanism for applying adhesive to the raised surface 9ᵃ of the feeding drum 9, the adhesive is contained in the tank 13 before alluded to which is sustained above the blank extracting mechanism and adjacent the feeding drum by the framework of the blank holder, it being understood that in a machine of the type of my said application, there will be two tanks and associated mechanisms for supplying the adhesive to the two feeding drums respectively at the opposite ends of the machine. In the present application, but one is shown, that at the left of the machine for applying adhesive to the blanks A. The master roll 114 before alluded to which dips into the tank, is journalled at its ends for rotation in bearings 120 furnished with the usual bearing caps 121 for confining the journals.

The adhesive is taken from the master roll and transferred to the raised surface of the feed drum 9, by means of a transfer roll 122 which extends parallel with the master roll and is journalled in the free end of a swinging support or frame 123 comprising two parallel arms 123ᵃ connected together in spaced relations by cross bars and mounted to rock on studs 125 on the blank holder framing. This frame 123 is adapted to support the transfer roll so that it will contact with the master roll, and will occupy such position relative to the feeding drum that in the rotation of the latter, the raised surface 9ᵃ thereon will engage the surface of the transfer roll; and by swinging the frame 123 backwardly, the transfer roll may be moved to inactive position as shown in dotted lines, Fig. 2, and out of operative relation to the master roll and feeding drum so that no adhesive will be applied to the latter. This feature is of importance, in that it is sometimes desirable to run the machine idly, or one side independently of the other side, when for instance the first winding operation is to be tried out. In these circumstances the adhesive applying mechanism at the other end of the machine will be rendered inactive; or when the machine is run idly, both adhesive applying mechanisms are rendered inactive.

The position of the transfer roll relative to the feeding drum is determined and controlled by means of two set screws 126 threaded in the respective bars of the swinging frame 123 and bearing at their lower ends on the top of the bearing caps as shown in Fig. 2. The position of the transfer roll relative to the master roll is determined and controlled by so mounting the transfer roll in the swinging frame that the roll may be adjusted to and from the master roll. In the present instance this is effected by the provision of open slots 123ᵇ in the free ends of the arms of the frame, in which slots blocks 128 on the journals of the transfer roll are mounted to slide back and forth for adjustment. Set screws 129 are threaded in the arms and engage the sides of the blocks to hold them in their adjusted position. By the adjusting actions effected by the two sets of set screws 126 and 129, the proper relation of the surface of the transfer roll to the master roll and to the feeding drum may be established and controlled, and when once established and the parts properly set, they will be undisturbed by the swinging action of the frame in rendering the mechanism inactive.

The master roll is rotated as before described by the sprocket chain 110 engaging the sprocket wheel 113 on the master roll, and its motion is transmitted by means of a driving pinion 130 on the master roll engaging a driven pinion 131 on the hub of a pulley 132 rotatably mounted on one of the studs 125 constituting the axis of the swinging frame. A driving band 133 passes over the pulley 132 and thence over a pulley 134 fixed to one of the journals of the transfer roll, and the proportions of the pinions and pulleys are such as to maintain a surface speed of the transfer roll equal to that of the feeding drum. By driving the transfer roll from a pinion on the axis of the swinging frame, the latter may be swung to render the transfer roll inactive, without disturbing the driving connections.

The mechanism for automatically arresting the operation of the machine in the event of the failure of the carton ejecting mechanism to eject the finished carton at station 4, will now be described. This mechanism is shown in Figs. 1, 9 and 10 and it is operated by the movement of the unejected carton from station 4 and it acts to shift driving belt 135 from the fast pulley 108 to the loose pulley 109 and thereby arrest the motion of the machine. The driving belt is engaged by a shifter head 136 on the end of a shifter arm 137 which extends downwardly and around the pulley and terminates in a straight portion 137ᵃ mounted in bearings 138 on the machine frame, so that when the arm is rocked in its bearings the shifter head will be swung axially of the pulleys and will thereby move the belt from one to the other as the case may be. A crank arm 139 is fixed to the end of the straight portion of the arm and extends upwardly therefrom and is pivoted to the rear end of a shifter rod 140 which extends forwardly and slides through a guide plate 141 at the front of the machine where it is provided with a stop pin 142 adapted by engagement with the guide plate to limit the rear movement of the rod. The rod is acted on by a spring 143 fixed at its forward end to the rod and anchored at its rear end to the frame and the spring tends to shift the rod to the rear and maintain the belt on the loose pulley, the stop pin 142 when the rod is thus shifted engaging the guide plate 141. The rod and shifter head are shown in the positions they occupy when the belt is on the fast pulley and the machine is in operation, and the rod is releasably held in this position by means of a latch pin 144 which engages in an open notch 145 in the lower edge of the rod. The pin is fixed to one end of a horizontal lever 146 pivoted between its ends to a bracket extending upwardly from the frame, and a vertical link 147 is pivoted at its lower end to the opposite end of the lever and is pivoted at its upper end to a movable member or detent 148 whose active end is disposed in the path of the projecting end of an unejected carton 149 as the said carton is moved from station 4 in the rotation of the mandrel carrying spider 2 before alluded to. Detent 148 is pivoted between its ends to the upper end of an arm 150 fixed at its lower end to a stub 151 fastened fixedly in the frame of the machine.

Assuming that the shifter rod is held by the latch pin 144 with the shifter head holding the belt on the fast pulley, and assuming that the carton ejecting mechanism has failed to eject the finished carton 149 from its mandrel, the front edge of the carton overhanging the end of the mandrel will as the spider 2 makes its advance, be engaged with the detent and rocking said detent, link 147 will be lifted and lever 146 rocked on its axis. This action will lower latch pin 144 and disengage the same from the notch in the shifter rod and will thereby release the rod, and spring 143 will pull the rod to the rear and thereby swing shifter arm 137 to the rear and shift the belt to the loose pulley. The machine will now come to rest.

The operations just described are automatic, and result in the instant stoppage of the machine on the failure of the finished carton to be properly ejected at the ejecting station. I propose, however, to provide means for controlling the shifter rod manually from both the front and rear of the machine so that the machine may be started and stopped from these positions, and may be started up again after its automatic arrest in the manner above described. To effect these objects I provide an actuating rod 152 for the shifter rod which extends alongside the shifter rod and is mounted to slide endwise relatively to the same through guides 153 and 154 fixed to the side of the shifter rod. At its front the actuating rod is extended through the guide plate 141 and its end is turned down to form an operating handle 155 by which it may be operated from the front of the machine. At its rear end the rod is bent down to form a handle 156 for operating it at the rear of the machine, which handle is adapted to engage a stop pin 157 on the side of the shifter rod and thereby limit the forward movement of the actuating rod relative to the shifter rod.

A spring 158 is connected at one end to the shifter rod and at its other end to the actuating rod and tends to pull the latter forwardly and maintain its rear handle in engagement with the stop pin. Where the actuating rod extends above the latch pin, the rod is formed with a cam surface 159 which when the actuating rod is pushed rearwardly from the position shown in Fig. 9, will engage and depress the latch pin and will thereby release the shifter rod and permit spring 143 to shift the belt from the fast to the loose pulley and bring the machine to rest. The same result may be effected from the rear of the machine by pulling on handle 156 and similarly shifting the actuating rod to the rear. In the movement of the shifter rod to the rear in shifting the belt from the fast to the loose pulley, the actuating rod is carried along with it due to the engagement of the stop pin 157 with the handle 156, and spring 143 will act to hold the parts in their shifted position with the belt on the loose pulley. This is the position which the parts will occupy following the manual operation of the mechanism, and also following its automatic operation, and to restore the parts to their former position with the belt on the fast pulley to again start the machine, the actuating rod is manually shifted forwardly either by the handle at the front or the handle at the rear, and due to the engagement of the rear handle with pin 157, the shifter rod will be moved forwardly against the action of spring 143 until the notch 145 in the shifter rod is brought above latch pin 144, whereupon the latter will enter the notch and lock the rod in its forward position. In this action the cam surface 159 on the actuating rod is moved free of the latch pin and allows it to enter the notch, and the belt is shifted from the loose pulley to the fast pulley and the operation of the machine started.

Having thus described my invention, what I claim is:

1. In a mechanism of the type described, the combination of a holder to contain a pile of blanks, holding means acting on the top blank and movable to release the same, means for separating the blank at its ends from the underlying blank, and means for advancing the separated blank when released by the holding means.

2. In a mechanism of the type described, the combination of a holder to contain a pile of blanks, a holding device acting on the middle portion of the pile to hold the topmost blank at said point and movable to release the same, means for separating the blank at its ends from the underlying blank, and means for advancing the separated blank when released by the holding device.

3. In a mechanism of the type described, the combination of a holder to contain a pile of blanks, means acting on the top blank to draw the ends of the same inwardly towards each other to separate the blank from that beneath, and means for advancing the separated blank.

4. In a mechanism of the type described, the combination of a holder to contain a pile of blanks, means acting on the top blank to confine the same and movable to release the blank, a holding device acting on the blank between the confining means and movable to release the blank, means movable into and out of engagement with the blank at the opposite sides of the holding device and operable to flex the blank when the latter is released by the confining means, and means operable to advance the blank when released by the holding device and the flexing means.

5. In a mechanism of the type described, the combination of a holder to contain a pile of blanks, means acting on the top blank at its opposite ends to confine the same and movable in unison to release the blank, holding means acting on the blank between the confining means and movable to release the blank, means movable into and out of engagement with the blank and operable to withdraw its ends from beneath the confining means, and means operable to advance the blank when released by the holding means.

6. In a mechanism of the type described, the combination of a holder to contain a pile of blanks, blades acting on the ends of the topmost blank to confine the same, a holding device acting on the blank between the confining blades and movable to release the blank, means for withdrawing the ends of the blank from beneath the confining blades and projecting said ends over said blades to separate the blank from that beneath, and means for advancing the separated blank.

7. In a mechanism of the type described, the combination of a holder to contain a pile of blanks, blades acting on the ends of the top blank to confine the same and movable to release the blank and further movable to confine the blank beneath, a holding device acting on the blank between the confining blades and movable to release the blank, means for withdrawing the ends of the blank from beneath the confining blades and projecting said ends over the blades to separate the blank from that beneath, and means for advancing the separated blank.

8. In a mechanism of the type described, the combination of a holder to contain a pile of blanks, a holding device acting on the middle portion of the top blank, means for confining the blank at its ends, means for withdrawing the ends of the blank from beneath the confining means to separate it from the underlying blank, and means for advancing the separated blank.

9. In a mechanism of the type described, the combination of a holder to contain a pile of blanks, horizontal blades adapted to seat on the opposite ends of the topmost blank at its edges to confine said ends, and means for moving said blades upwardly to release the blank and then downwardly to confine the next blank beneath.

10. In a mechanism of the type described, the combination of a holder to contain a pile of blanks, blades adapted to act on the opposite ends of the topmost blank to confine the same, means for raising said blades to release the blank and for lowering the blades to confine the next blank beneath, and means for withdrawing the ends of the blank from beneath the raised blades and projecting them over the lowered blades to separate said blank from the blank beneath.

11. In a mechanism of the type described, the combination of a holder to contain a pile of blanks, a holding device adapted to act on the topmost blank of the pile at its middle portion, and means for flexing the held blank at opposite sides of the holding device to separate said blank from the blank beneath.

12. In a mechanism of the type described, the combination of a holder to contain a pile of blanks, horizontal blades acting on the ends of the topmost blank of the pile to confine the same and inclined inwardly and downwardly at their upper sides, means for raising the blades to release the confined blank and for lowering the blades to confine the next blank beneath, and means for withdrawing the ends of the released blank from beneath the blades and projecting them up the inclined upper sides of said blades.

13. In a mechanism of the type described, the combination of a holder to contain a pile of blanks, and means for flexing the topmost blank to separate the same from the next blank beneath, said means comprising a pair of rolls adapted to be engaged with the topmost blank and means for rotating said rolls to draw the ends of the blank inwardly towards each other.

14. In a mechanism of the type described, the combination of a holder to contain a pile of blanks, and means for flexing the topmost blank to separate the same from the next blank beneath, said means comprising a pair of rolls movable into and out of engagement with the topmost blank adjacent its ends and means for rotating said rolls when engaged with the blank to draw the ends of the same inwardly towards each other.

15. In a mechanism of the type described, the combination of a holder to contain a pile of blanks, and means for flexing the topmost blank to separate the same from the blank beneath, said means comprising a pair of rolls adapted to engage the topmost blank and means for rotating said rolls to draw the ends of the blank inwardly towards each other and thereby flex the same and for rotating the rolls in the opposite direction to straighten out the flexed blank.

16. In a mechanism of the type described, the combination of a holder to contain a pile of blanks, and means for flexing the topmost blank to separate the same from the blank beneath, said flexing means comprising a roll adapted to be moved into engagement with the topmost blank and means for rotating said roll first in one direction to draw the ends of the blank inwardly and then in the opposite direction to straighten out the blank.

17. In a mechanism of the type described, the combination of a holder to contain a pile of blanks, a device acting on the topmost blank between its ends to hold the same at said point, and means for flexing the blank at opposite sides of the holding device to separate the blank from that beneath, said means comprising a pair of rolls adapted to engage the topmost blank respectively at opposite sides of the holding device and means for rotating said rolls to draw the ends of the blank inwardly towards each other.

18. In a mechanism of the type described, the combination of a holder to contain a pile of blanks, a support sustained above the holder and movable up and down, a roll sustained by said support, an operating member for the support adapted when engaged therewith to raise the same and elevate the roll and movable to disengage the support, means acting on the support to lower the same and engage the roll with the topmost blank when the support is disengaged by the operating member, and means for rotating the roll when engaged with the blank.

19. In a mechanism of the type described, the combination of a holder to contain a pile of blanks, a support sustained above the holder and movable up and down, a roll rotatably sustained by said support, an operating member for the support adapted when engaged therewith to raise the same and elevate the roll and movable to disengage the support, a spring acting on the support to lower the same and engage the roll with the topmost blank when the operating member is disengaged from the support, and means actuated by said operating member for rotating the roll when the operating member is disengaged from the support.

20. In a mechanism of the type described, the combination of a holder to contain a pile of blanks, a rocking support arranged above the holder, a roll rotatably sustained by said support to move up and down to respectively engage and disengage the top blank, a rock shaft provided with means to engage the support and rock the same to elevate the roll and movable to disengage the support, a spring acting on the support to rock the same and lower the roll when the support is disengaged by said member, and means for rotating the roll when engaged with the blank.

21. In a mechanism of the type described, the combination of a holder to contain a pile of blanks, a support sustained above the holder and movable up and down, a roll rotatably sustained by the support, a rocking operating member for the support adapted when engaged therewith to raise the same and elevate the roll and movable to disengage the support, means acting on the support to lower the same and engage the roll with the topmost blank when the rocking member is disengaged from the support, a ratchet wheel on the roll, and a rack bar engaging the ratchet wheel and operatively connected with the rocking member to rotate the roll when the rocking member disengages the support.

22. In a mechanism of the type described, the combination of a holder to contain a pile of blanks, a device adapted to engage the topmost blank to hold the same and movable upward to release the blank, a member supported by said device and movable relatively thereto to advance the released blank, and means for operating said parts.

23. In a mechanism of the type described, the combination of a holder to contain a pile of blanks, a device adapted to act on the topmost blank and hold the same and movable to release the blank, means for separating the blank at its ends from the blank beneath while being held by said holding device, and means sustained by and movable relatively to the holding device for advancing the separated blank.

24. In a mechanism of the type described, the combination of a holder to contain a pile of blanks, a device to act on the top blank and hold the same, said device being movable to release the blank, a slide sustained by the holding device and movable relatively thereto, a member carried by the slide and adapted to engage the blank to advance the same, means for moving the holding device to release the blank, and means for moving the slide relatively to the holding device to cause said member to advance the released blank.

25. In a mechanism of the type described, the combination of a holder to contain a pile of blanks, means for separating the top blank from the blank beneath, and means for advancing the separated blank, said latter means comprising a suitable support movable in the direction of the advance of the blank, a pusher member to engage the separated blank parallel links pivoted respectively to the support and pusher member and means acting on the support for moving it to advance the pusher member.

26. In a mechanism of the type described, the combination of a holder to contain a pile of blanks, means for separating the topmost blank from that beneath, and means for advancing the separated blank, said latter means comprising a slide movable in the direction of advance of the blank, a pusher member to engage the separated blank downwardly and forwardly inclined links pivoted respectively to the slide and pusher member and means acting on the slide to move the same and advance the pusher member.

27. In a mechanism of the type described, the combination of a holder to contain a pile of blanks, means for separating the topmost blank from that beneath, means for advancing the separated blank, said latter means comprising a support movable in the direction of advance of the blank, a pusher member to engage the separated blank, a flexible connection between the pusher member and the support, and means for moving the support to advance the pusher member.

28. In a mechanism of the type described, the combination of a holder to contain a pile of blanks, a movable pusher member adapted to engage the top blank, a spring member acting on the pusher member, an actuating member for the pusher member, said actuating member being normally disengaged from the pusher member and being operable to periodically engage said spring member with a downward pressure and engage the pusher member with a forward pressure, and means for operating said actuating member, whereby the pusher member will be held down with a yielding pressure while being positively advanced.

29. In a mechanism of the type described, the combination of a holder to contain a pile of blanks, a movable pusher member adapted to engage the topmost blank and provided with an abutment, a spring member acting on the pusher member, and an actuating member for the pusher member, said actuating member being normally disengaged from the pusher member and abutment and being operable to periodically engage the same and acting to force the pusher member down with a yielding pressure while positively advancing the same.

30. In a mechanism of the type described, the combination of a holder to contain a pile of blanks, means for separating the top blank from that beneath, and means for advancing the separated blank, said latter means comprising a support movable in the direction of advance of the blank, a pusher member flexibly connected with the support to engage the separated blank, a spring arm acting on the pusher member and a movable operating member adapted in its movements to depress the spring arm and engage the pusher member with the blank and then to engage the support and move the same to advance the pusher member.

31. In a mechanism of the type described, the combination of a holder to contain a pile of blanks, means for separating the top blank from that beneath, and means for advancing the separated blank, said latter means comprising a support overlying the top blank and movable in the direction of advance of the same and provided with upstanding posts, a pusher member and parallel links pivoted to said posts and pusher member respectively and inclining forwardly and downwardly, and means for moving the support to advance the pusher member.

32. In a mechanism of the type described, the combination of a holder to contain a pile of blanks, means acting on the ends of the top blank and movable to release the same and movable also to confine the next blank beneath, means acting on the topmost blank between the confining means to hold the same and movable to release the blank, means movable into and out of engagement with the blank at the opposite sides of the holding means and operable to flex the blank and draw the ends of the same inwardly towards each other, and then project said ends outwardly again, whereby the blank will be separated from that beneath, means for advancing the separated blank, and operating mechanisms for said several means, said operating mechanisms being coordinated with each other in their actions to cause the confining means to be first raised, then the flexing means to be operated to withdraw the ends of the blank from beneath the confining means, then the confining means to be lowered on the blank beneath, then the flexing means operated to straighten out the flexed blank and then disengaged therefrom, then the holding means operated to release the blank, and finally the advancing means operated to advance the released blank.

In testimony whereof, I have affixed my signature hereto.

GEORGE W. BEADLE.